(12) United States Patent
Hiraguchi

(10) Patent No.: US 7,354,016 B2
(45) Date of Patent: Apr. 8, 2008

(54) REEL

(75) Inventor: Kazuo Hiraguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 384 days.

(21) Appl. No.: 11/101,533

(22) Filed: Apr. 8, 2005

(65) Prior Publication Data
US 2005/0236512 A1 Oct. 27, 2005

Related U.S. Application Data

(63) Continuation-in-part of application No. 10/745,937, filed on Dec. 29, 2003, now abandoned.

(51) Int. Cl.
*B65H 75/14* (2006.01)
(52) U.S. Cl. .............. 242/609.4; 242/348; 360/132
(58) Field of Classification Search ............ 242/348, 242/607, 609, 609.4, 348.2; 360/132
See application file for complete search history.

(56) References Cited

U.S. PATENT DOCUMENTS 6,273,352 B1  8/2001  Johnson et al.
6,315,230 B1  11/2001 Hansen et al.

FOREIGN PATENT DOCUMENTS

JP  11-53862 A  2/1999

*Primary Examiner*—John Q. Nguyen
(74) *Attorney, Agent, or Firm*—Sughrue Mion, PLLC

(57) ABSTRACT

A reel has: a hub which is shaped as a cylindrical tube having a bottom, and around which a recording tape is wound; a flange provided at an end portion of the hub, and holding a widthwise direction end portion of the recording tape; a reel plate attracted by magnetic force to a rotating shaft of a drive device; and a pin for caulking which projects from a bottom surface of a floor wall of the hub, for attachment of the reel plate. A positioning portion, which positions the pin for caulking, is provided at a top surface of the floor wall of the hub.

25 Claims, 14 Drawing Sheets

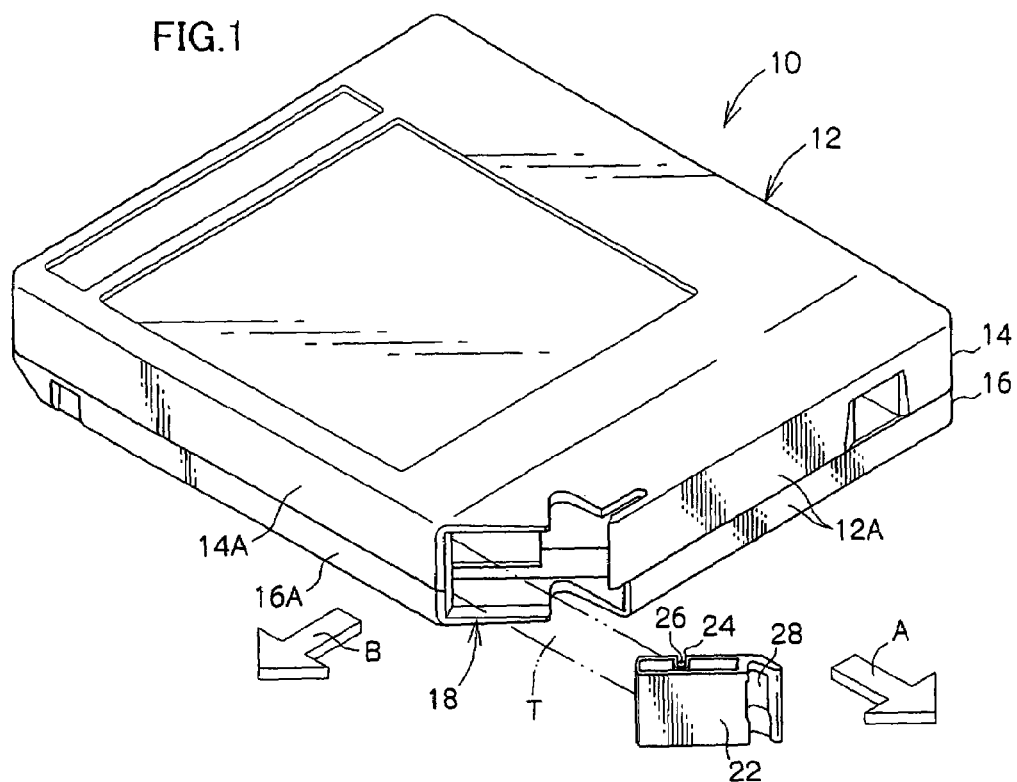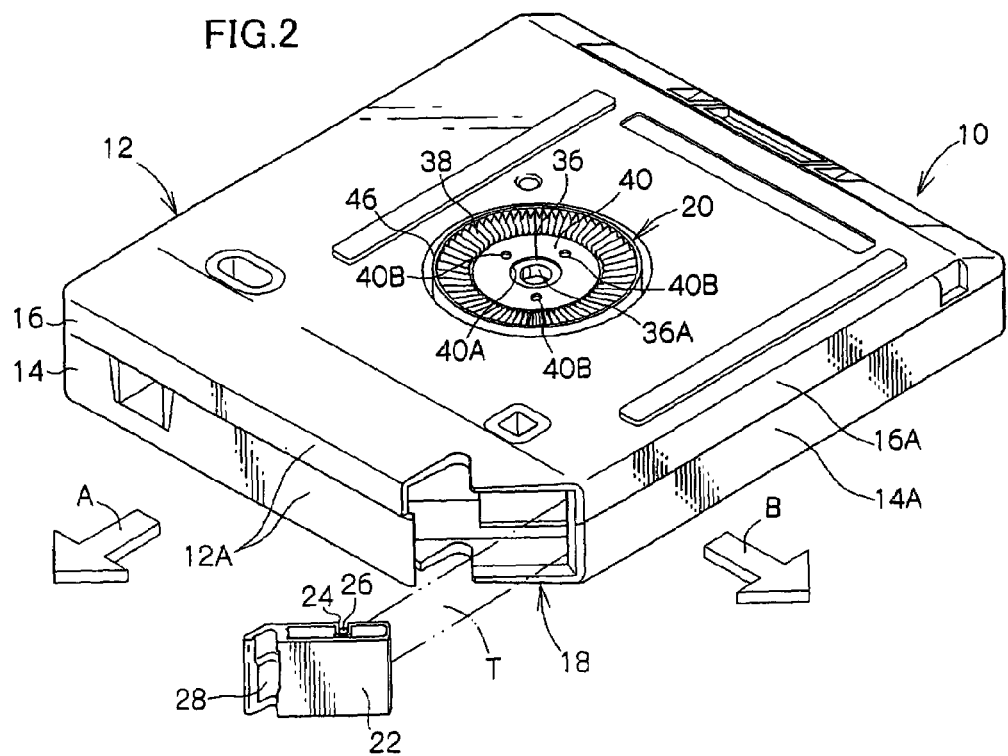

REEL

This is a Continuation-In-Part of application Ser. No. 10/745,937 filed Dec. 29, 2003 now abandoned.

BACKGROUND OF THE INVENTION

1. Field of the Invention

The present invention relates to a reel on which is wound a recording tape, such as a magnetic tape or the like, which is used for storing data of computers or the like.

2. Description of the Related Art

There have conventionally been known recording tape cartridges in which a recording tape, such as a magnetic tape or the like which is used as a data recording/playback medium for computers or the like, is wound on a single reel, and the reel is accommodated within a case. A leader member, such as a leader block, a leader pin, or a leader tape, is provided at the distal end of the recording tape. A pull-out member provided at a drive device pulls the leader member out from the recording tape cartridge, and winds the recording tape fixed thereto onto a take-up reel of the drive device.

A reel gear is formed in an annular form in the center of the bottom surface of the reel which is exposed from an open hole formed in the bottom surface of the recording tape cartridge. The reel is driven to rotate by a driving gear, which is provided at a rotating shaft of the drive device, meshing with the reel gear. Accordingly, by rotating the reel of the recording tape cartridge and the take-up reel of the drive device synchronously, data can be recorded onto the recording tape, or data recorded on the recording tape can be played back.

A reel plate, which is formed of metal and which can be attracted by magnetic force, is attached in an annular form further toward the inner side of the recording tape cartridge than the reel gear. A magnet is provided in an annular form further toward the inner side of the rotating shaft of the drive device than the driving gear. Accordingly, when the driving gear meshes with the reel gear, the magnet attracts the reel plate. The torque of the driving gear is thereby efficiently transmitted to the reel gear.

There are cases in which the reel plate is attached integrally to the hub due to three pins for caulking, which project from the bottom surface of the floor wall of the hub, being inserted through three holes formed in the reel plate, and the pins for caulking then being caulked. However, in such cases, the relative positioning of the holes and the pins for caulking is carried out manually by appropriately rotating the hub or the reel plate. Therefore, the efficiency of manufacturing the reel is poor.

SUMMARY OF THE INVENTION

Thus, an object of the present invention is to provide a reel in which the relative positioning of a hub and a reel plate can be carried out efficiently, and to provide a method of attaching the reel plate.

In order to achieve the above object, a reel relating to the present invention and recited in claim 1 comprises: a hub which is shaped as a cylindrical tube having a bottom, and around which a recording tape is wound; a flange provided at an end portion of the hub, and holding a widthwise direction end portion of the recording tape; a reel plate attracted by magnetic force to a rotating shaft of a drive device; and a pin for caulking which projects from a bottom surface of a floor wall of the hub, for attachment of the reel plate, wherein a positioning portion which positions the pin for caulking is provided at a top surface of the floor wall of the hub.

A reel recited in claim 7 comprises: a hub which is shaped as a cylindrical tube having a bottom, and around which a recording tape is wound; an upper flange provided integrally at an upper end portion of the hub, and holding a widthwise direction upper end portion of the recording tape; a lower flange fused to a lower end portion of the hub, and holding a widthwise direction lower end portion of the recording tape; a reel plate attracted by magnetic force to a rotating shaft of a drive device; and a pin for caulking which projects from a bottom surface of a floor wall of the hub, for attachment of the reel plate, wherein a positioning portion which positions the pin for caulking is provided at a top surface of the floor wall of the hub.

With such a structure, the pin for caulking is always disposed in a fixed direction. Accordingly, the relative positioning of the pin for caulking of the hub, and the hole of the reel plate, can be carried out efficiently. Namely, because the hole of the reel plate can be fit efficiently on the pin for caulking, the manufacturing efficiency is improved.

A method of attaching a reel plate relating to the present invention and recited in claim 15 comprises the steps of: setting a hub, which is shaped as a cylindrical tube having a bottom and around which a recording tape is wound, at a receiving stand; causing a positioning portion provided at a top surface of a floor wall of the hub to engage with a portion-to-be-positioned formed at the receiving stand; fitting a hole of a reel plate onto a pin for caulking which projects from a bottom surface of the floor wall of the hub set at the receiving stand; and caulking the pin for caulking.

In accordance therewith, the hub is disposed such that the pin for caulking is always oriented in a fixed direction with respect to the receiving stand. Accordingly, the relative positioning of the pin for caulking of the hub, and the hole of the reel plate, can be carried out efficiently. Namely, because the hole of the reel plate can be fit efficiently on the pin for caulking, the manufacturing efficiency is improved.

BRIEF DESCRIPTION OF THE DRAWINGS

FIG. 1 is a schematic perspective view, as seen from above, of a recording tape cartridge.

FIG. 2 is a schematic perspective view, as seen from below, of the recording tape cartridge.

DETAILED DESCRIPTION OF THE INVENTION

Figure 3:
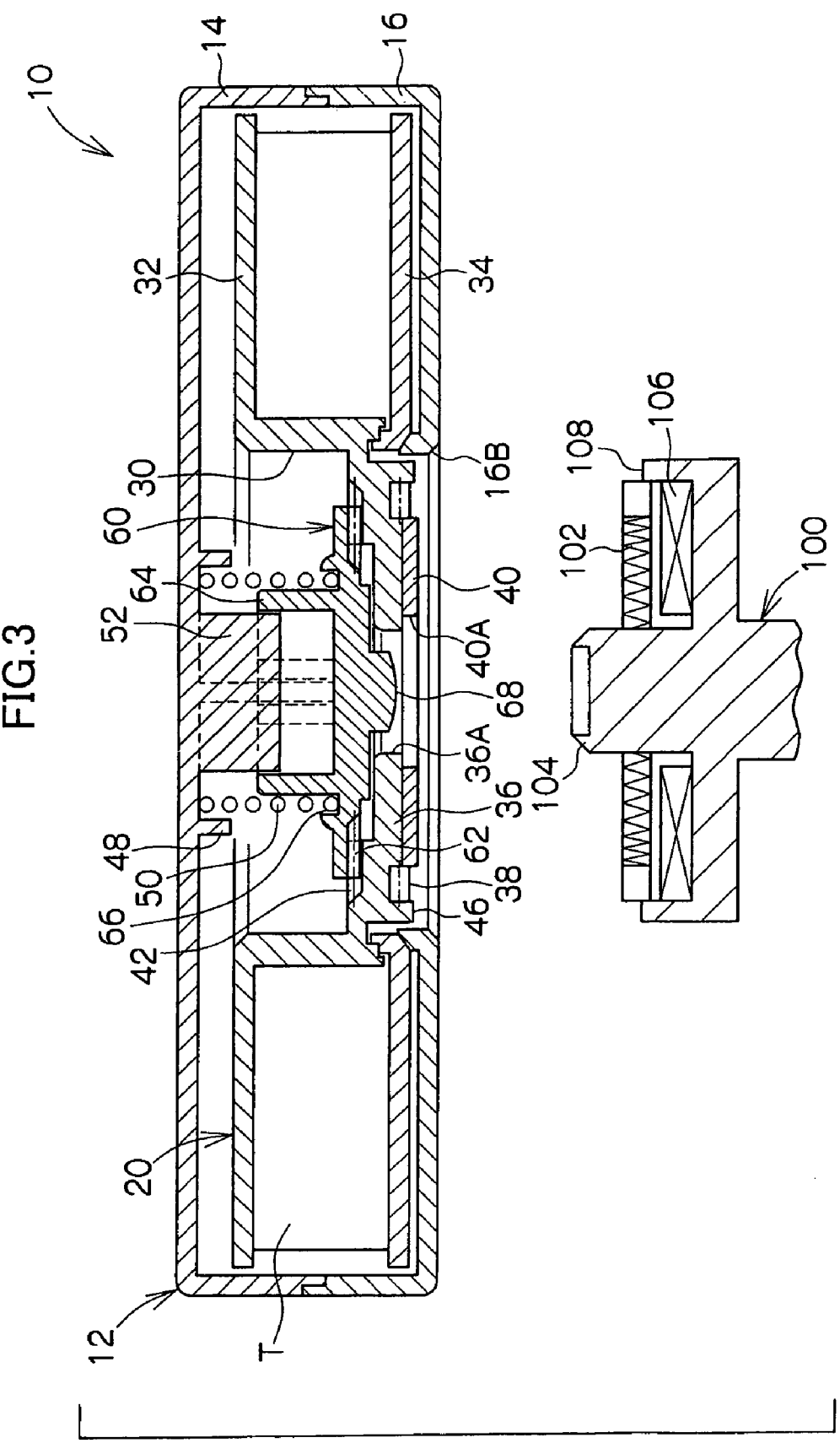
FIG. 3 is a schematic side sectional view showing a state before a rotating shaft meshes with the recording tape cartridge.
Figure 4:
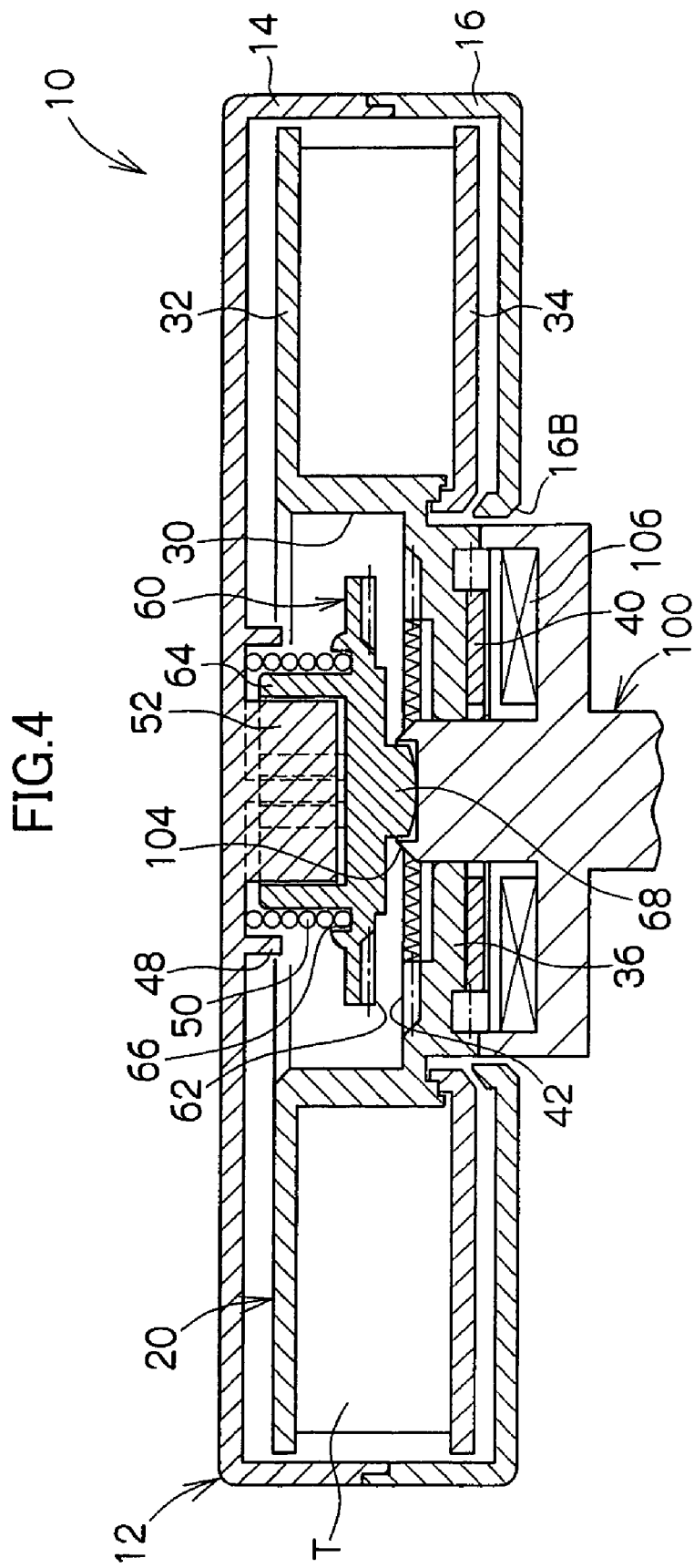
FIG. 4 is a schematic side sectional view showing a state after the rotating shaft meshes with the recording tape cartridge.
Figure 5:
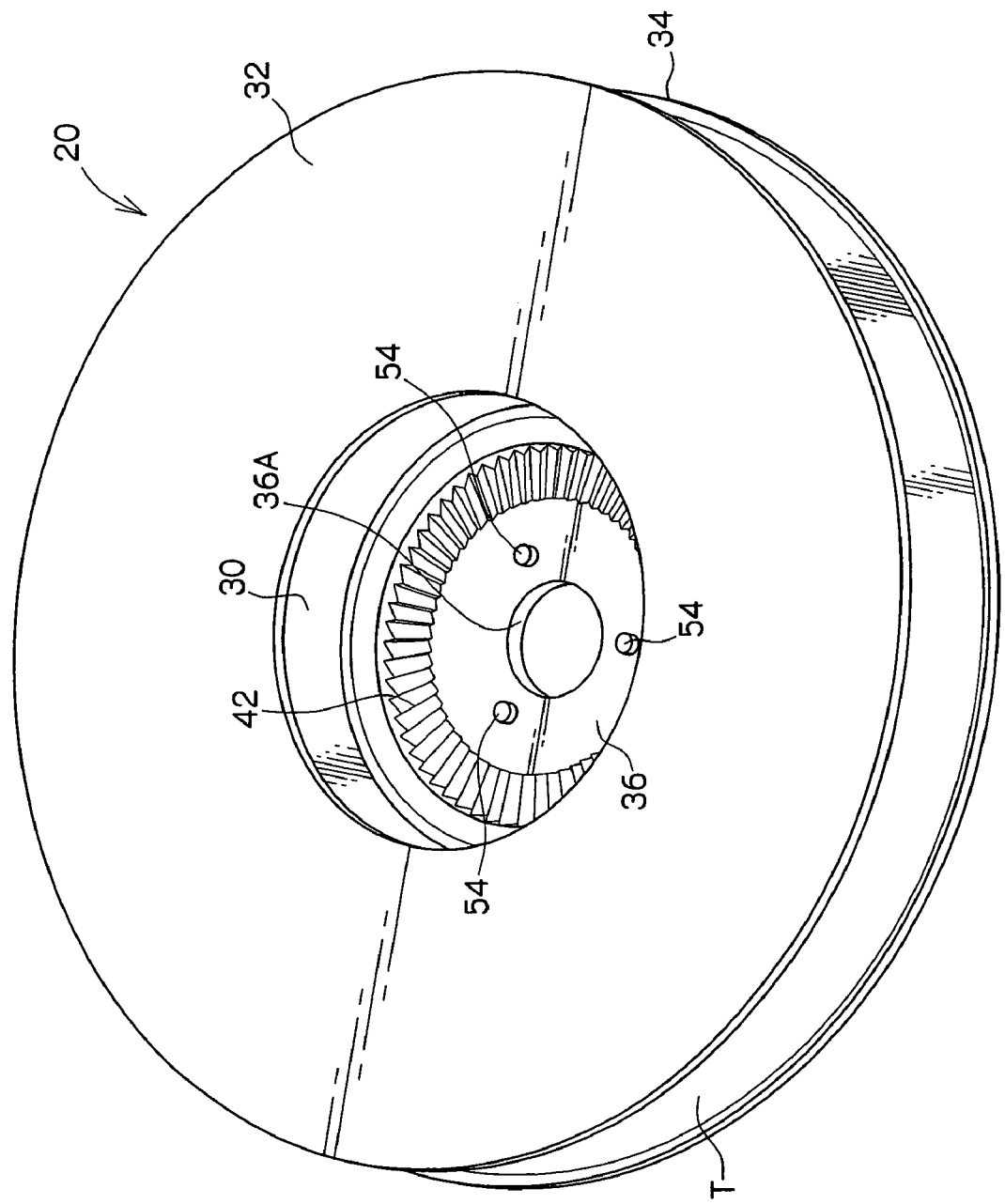
FIG. 5 is a schematic perspective view of a reel at which positioning portions (convex portions) are formed.
Figure 6:
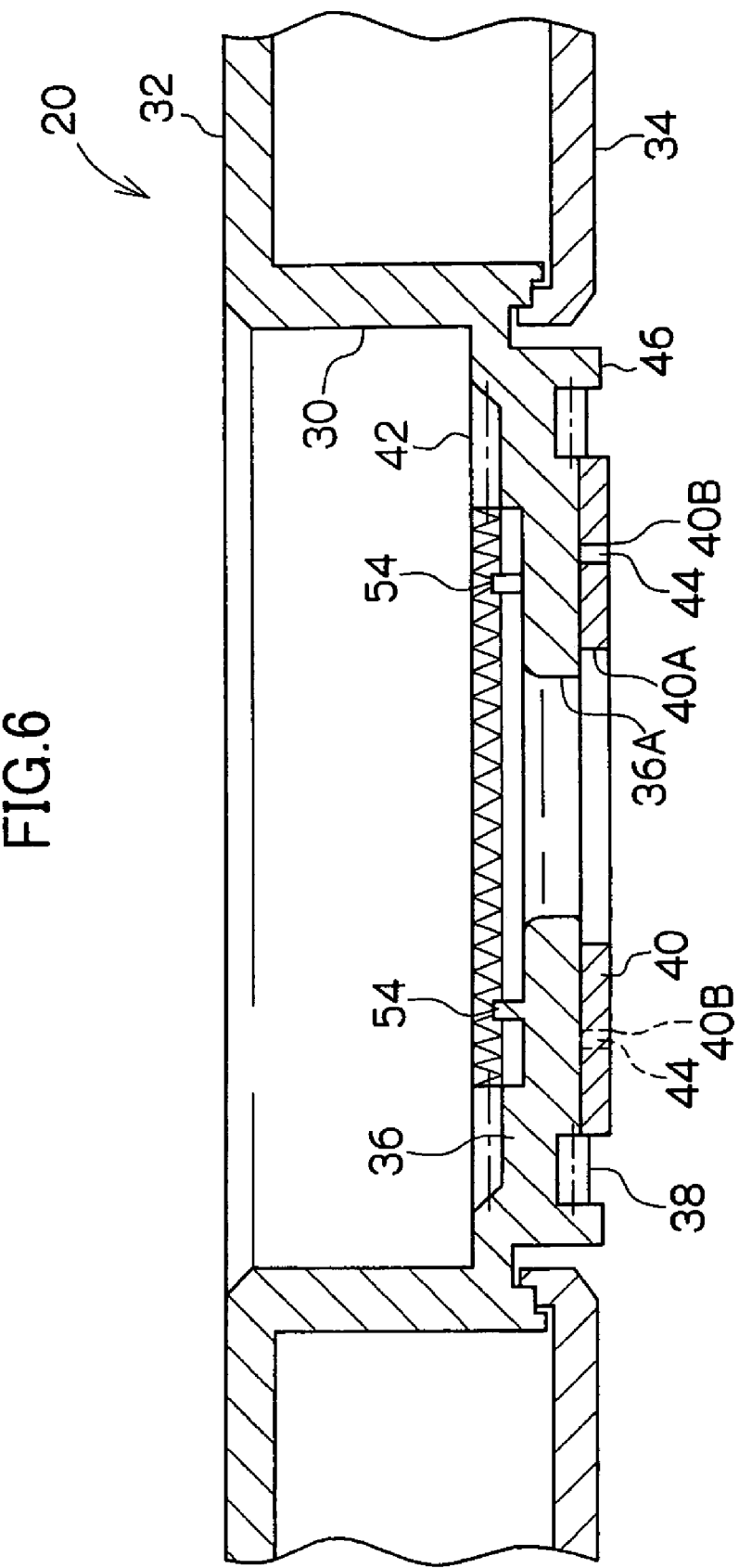
FIG. 6 is a schematic side sectional view showing, in an enlarged manner, a portion of the reel at which the positioning portions (the convex portions) are formed.

Hereinafter, embodiments of the present invention will be described in detail on the basis of the drawings. Note that the reel relating to the present invention is applied to a recording tape cartridge 10. Accordingly, for convenience of explanation, the direction of loading the recording tape cartridge 10 into a drive device is denoted by arrow A and is the front direction. The direction of arrow B, which is orthogonal to the direction of arrow A, is the rightward direction.

First, the overall structure of the recording tape cartridge 10 will be described. As shown in FIGS. 1 through 4, the recording tape cartridge 10 has a substantially rectangular box-shaped case 12. The case 12 is structured by an upper case 14 and a lower case 16, which are formed of a synthetic resin, being joined together by ultrasonic welding or screws or the like in a state in which peripheral walls 14A, 16A thereof abut one another.

A single reel 20 is accommodated within the case 12. A recording tape T, which is a magnetic tape or the like and which serves as an information recording/playback medium, is wound around the reel 20. An opening 18 is formed in the front right corner portion of the case 12. The opening 18 is for the pulling out, to the exterior, of the recording tape T wound on the reel 20.

A leader block 22 is attached to the distal end portion of the recording tape T. Namely, an elastic pin 26 is fit into a concave portion 24 of the leader block 22 in a state of nipping-in the distal end of the recording tape T. When the recording tape cartridge 10 is not in use, the leader block 22 is anchored on the peripheral edge of the opening 18 and closes the opening 18.

Figure 15A:
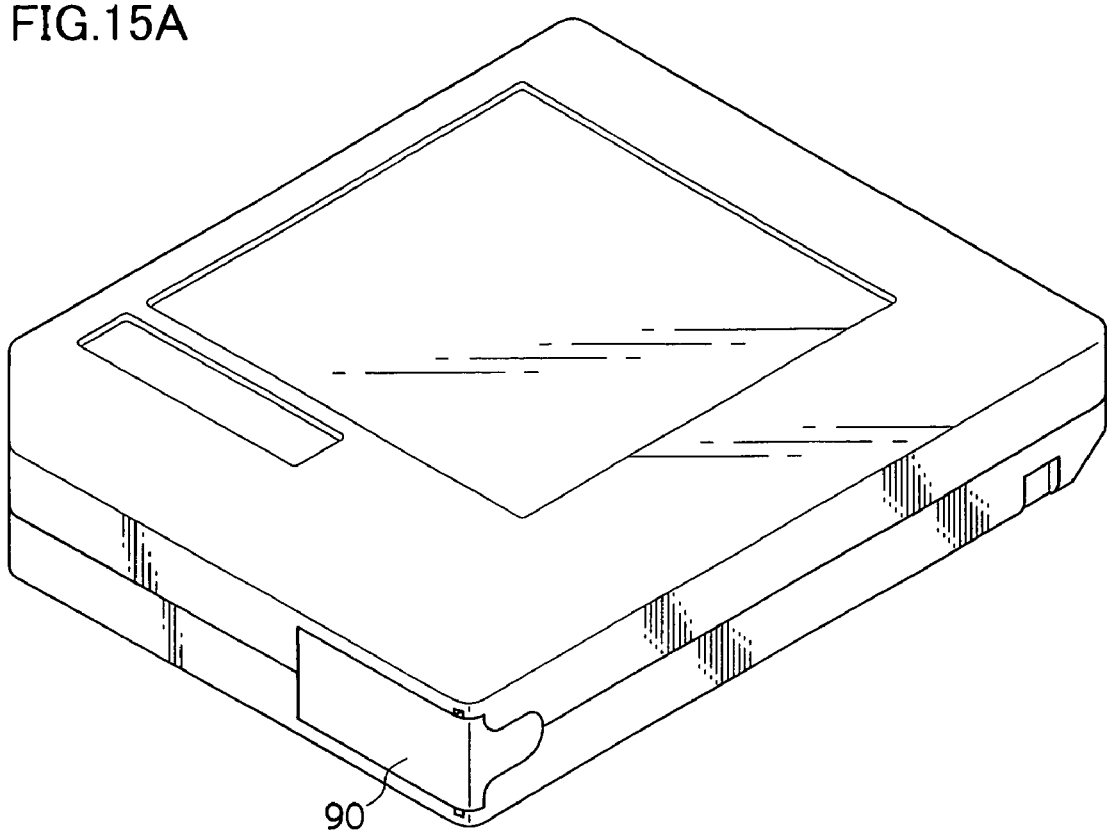
FIG. 15A is a schematic perspective view showing a recording tape cartridge of another embodiment.
Figure 15B:
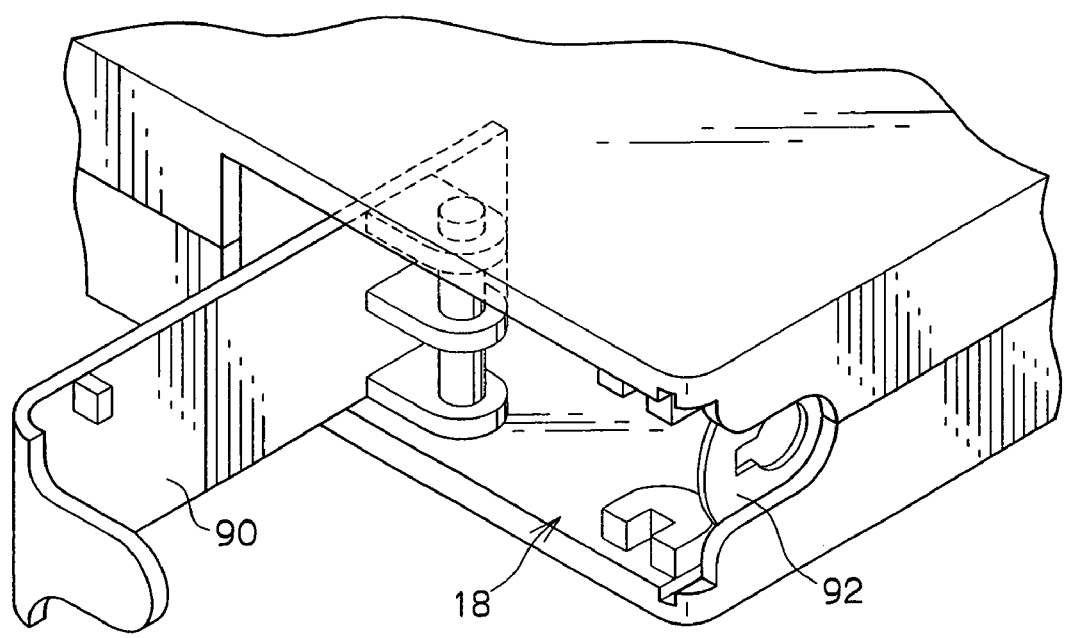
FIG. 15B is a schematic perspective view showing, in an enlarged manner, an opening of the recording tape cartridge shown in FIG. 15A.

When the recording tape cartridge 10 is to be used, the leader block 22 is pulled-out from the opening 18 due to a pull-out member (not illustrated) provided at a drive device engaging with an engaging portion 28 formed at the distal end of the leader block 22. Note that the structure attached to the distal end portion of the recording tape T is not limited to the leader block 22. As shown in FIGS. 15A and 15B, a rotating door 90 which closes the opening 18 may be provided, and a leader tape 92 or a leader pin (not illustrated) or the like may be attached to the distal end portion of the magnetic tape T.

The reel 20 is formed of resin, and is structured by a hub 30 which is shaped as a cylindrical tube having a bottom, an upper flange 32 which extends integrally from the top end portion of the hub 30, and a lower flange 34 which is attached by fusing or the like to the bottom end portion of the hub 30. The upper flange 32 and the lower flange 34 hold the transverse direction end portions of the recording tape T which is wound around the outer peripheral surface of the hub 30. Note that the hub 30 and the lower flange 34 are molded by using resin materials which are compatible with one another, and can be fused together by ultrasonic waves or the like.

A pass-through hole 36A is formed in the axially central portion of a floor wall 36 provided at the lower flange 34 side of the hub 30. A reel gear 38 is formed in an annular form at the bottom surface side of the floor wall 36. Due to the reel 20 being pushed toward the lower case 16 by the urging force of a compression coil spring 50, the reel gear 38 is exposed from a circular gear opening 16B which is formed in the substantial center of the lower case 16. The reel gear 38 meshes with a driving gear 102 provided at a rotating shaft 100 of a drive device, and transmits rotational power to the reel 20.

A reel plate 40 is fixed to the radial direction inner side of the reel gear 38. The reel plate 40 is formed of a magnetic material in an annular form. A through hole 40A, which has a diameter which is slightly larger (1 mm or less larger) than that of the pass-through hole 36A, is formed in the axially central portion of the reel plate 40. The reel plate 40 has three small holes 40B formed at uniform intervals. Three pins 44 for caulking project at uniform intervals from the bottom surface of the floor wall 36 of the hub 30 (see FIG. 8). Accordingly, the pins 44 for caulking are inserted through the small holes 40B, and thereafter, the pins 44 for caulking are caulked by ultrasonic waves generated from a horn (not illustrated). The reel plate 40 is thereby attached integrally to the bottom surface of the floor wall 36.

On the other hand, at the rotating shaft 100 of the drive device, a magnet 106 is provided in an annular form between the driving gear 102 and a releasing projection 104 which will be described later. Accordingly, in a state in which the driving gear 102 and the reel gear 38 are completely meshed together, the magnet 106 attracts the reel plate 40 by magnetic force. In this way, axial offset of the reel 20 and the rotating shaft 100 is prevented, and the meshed-together state of the reel gear 38 and the driving gear 102 can be maintained. Namely, due to such a structure, when the rotating shaft 100 rotates around the axis thereof, the reel 20 rotates within the case 12 integrally with the rotating shaft 100.

An annular projection 46, which is a reference surface, projects at the outer peripheral portion of the reel gear 38. Positioning of the reel 20 in the heightwise direction is carried out by a top surface 108 at the outer peripheral side of the driving gear 102 of the rotating shaft 100 abutting the annular projection 46. Note that the reference surface is not limited to the illustrated annular projection 46, and may be structured by an annular concave portion (not illustrated), or by projections (not illustrated) which project discretely, or the like.

Moreover, an engaging gear 42 is formed in an annular form at the top surface side of the floor wall 36 of the hub 30. The engaging gear 42 can mesh with a braking gear 62 of a braking member 60. The braking member 60 is formed substantially in the shape of a disc, and is accommodated within the hub 30 so as to be able to move upward and downward. The braking gear 62 is formed in an annular form at the outer peripheral portion of the bottom surface of the braking member 60. An engaging concave portion 64, which is formed substantially in the shape of a cross as seen in plan view, stands erect at the top surface of the braking member 60.

On the other hand, a rotation restricting rib 52, which is formed substantially in the shape of a cross as seen in plan view, is provided vertically at the center of the inner surface of the upper case 14. Rotation of the braking member 60 is impeded due to the rotation restricting rib 52 being inserted into the engaging concave portion 64. Further, an annular groove 66 is provided at the outer side of the engaging concave portion 64 of the braking member 60. An annular projection 48 projects at the outer side of the rotation restricting rib 52 of the upper case 14. The compression coil spring 50 serving as an urging member is held between the annular groove 66 and the inner side of the annular projection 48. Namely, the compression coil spring 50 is thereby interposed between the braking member 60 and the upper case 14.

Accordingly, when the recording tape cartridge 10 is not being used, the rotation restricting rib 52 is inserted in the engaging concave portion 64 such that rotation of the braking member 60 with respect to the case 12 is impeded. Due to the urging force of the compression coil spring 50, the braking gear 62 of the braking member 60, whose rotation with respect to the case 12 is impeded, is urged toward the engaging gear 42 within the hub 30, and strongly meshes with the engaging gear 42. In this way, when the recording tape cartridge 10 is not in use, inadvertent rotation of the reel 20 is prevented.

An operation projection 68, which is substantially shaped as a cylindrical column and which can be inserted through the pass-through hole 36A, projects at the center of the bottom surface of the braking member 60. The operation projection 68 can abut the releasing projection 104 which projects at the axially central portion of the rotating shaft 100 of the drive device. Accordingly, when the recording tape cartridge 10 is used (i.e., is loaded in a drive device), the releasing projection 104 abuts the operation projection 68, and pushes the braking member 60 upward against the urging force of the compression coil spring 50. In this way, the meshing of the braking gear 62 and the engaging gear 42 is cancelled, and simultaneously therewith, the reel gear 38 and the driving gear 102 mesh together. Rotation of the reel 20 thereby becomes possible.

Note that the through hole 40A of the illustrated reel plate 40 is formed to have a diameter which is slightly larger (1 mm or less larger) than that of the pass-through hole 36A. However, the through hole 40A may be formed to have substantially the same diameter as that of the through hole 36A. However, when the diameter of the through hole 40A of the reel plate 40 is larger than that of the pass-through hole 36A, it is possible to reliably avoid the releasing projection 104 of the drive device from interfering with the reel plate 40. Therefore, such a structure is preferable.

Here, operation of the recording tape cartridge 10 will be described. When the recording tape cartridge 10 is not in use (i.e., is not loaded in a drive device, such as is being stored or being transported or the like), the opening 18 is closed by the leader block 22. When the recording tape cartridge 10 is to be used, the recording tape cartridge 10 is loaded into a drive device along the direction of arrow A, with a front wall 12A thereof leading.

When the recording tape cartridge 10 is loaded (inserted) into the drive device, the releasing projection 104 is inserted in from the pass-through hole 36A, either by the recording tape cartridge 10 being lowered by a predetermined height, or by the rotating shaft 100 being raised. Then, the releasing projection 104 pushes the operation projection 68 upward, such that meshing of the engaging gear 42 and the braking gear 62 is released.

Then, the top surface 108 of the releasing shaft 100 abuts the annular projection 46 such that positioning of the reel 20 in the heightwise direction is carried out, and the reel plate 40 is attracted by the magnet 106. In this way, the recording tape cartridge 10 (the reel 20) is accurately positioned within the drive device, and in this state, the driving gear 102 meshes with the reel gear 38.

On the other hand, the pull-out member (unillustrated) of the drive device engages with the engaging portion 28 of the leader block 22, and pulls the leader block 22 out from the case 12. At this time, because the recording tape cartridge 10 is accurately positioned within the drive device, the pull-out member can reliably engage with the engaging portion 28 of the leader block 22. In this way, the leader block 22, which is pulled-out from the recording tape cartridge 10, is accommodated in a fit-in portion formed in the hub (not illustrated) of the take-up reel of the drive device.

When the leader block 22 is accommodated in the fit-in portion of the take-up reel, the reel 20 and the take-up reel are driven to rotate synchronously by the rotating shaft 100. In this way, the recording tape T is successively pulled-out from the interior of the recording tape cartridge 10 while being taken-up onto the take-up reel, and data is recorded onto the recording tape T or data recorded on the recording tape T is played-back by a recording/playback head (not illustrated) which is disposed along a predetermined tape path.

Thereafter, when the recording tape cartridge 10 is to be ejected from the drive device, first, the recording tape T is rewound onto the reel 20, and the leader block 22 closes the opening 18. Then, due to either the recording tape cartridge 10 being raised or the rotating shaft 100 being lowered, the magnet 106 moves apart from the reel plate 40. The releasing projection 104 is pulled-out from the pass-through hole 36A, and meshing of the driving gear 102 and the reel gear 38 is cancelled.

At this time, because the operation projection 68 is urged downward by the compression coil spring 50, accompanying the operation of the releasing projection 104 being pulled-out from the pass-through hole 36A, the releasing projection 104 moves to a lower position (locking position), and the braking gear 62 meshes with the engaging gear 42. In this way, a locked state arises in which inadvertent rotation of the reel 20 is impeded. Then, the recording tape cartridge 10 which is in this state is moved, by an unillustrated ejecting mechanism, in the direction opposite to the direction of arrow A, and is discharged from the interior of the drive device.

Figure 7:
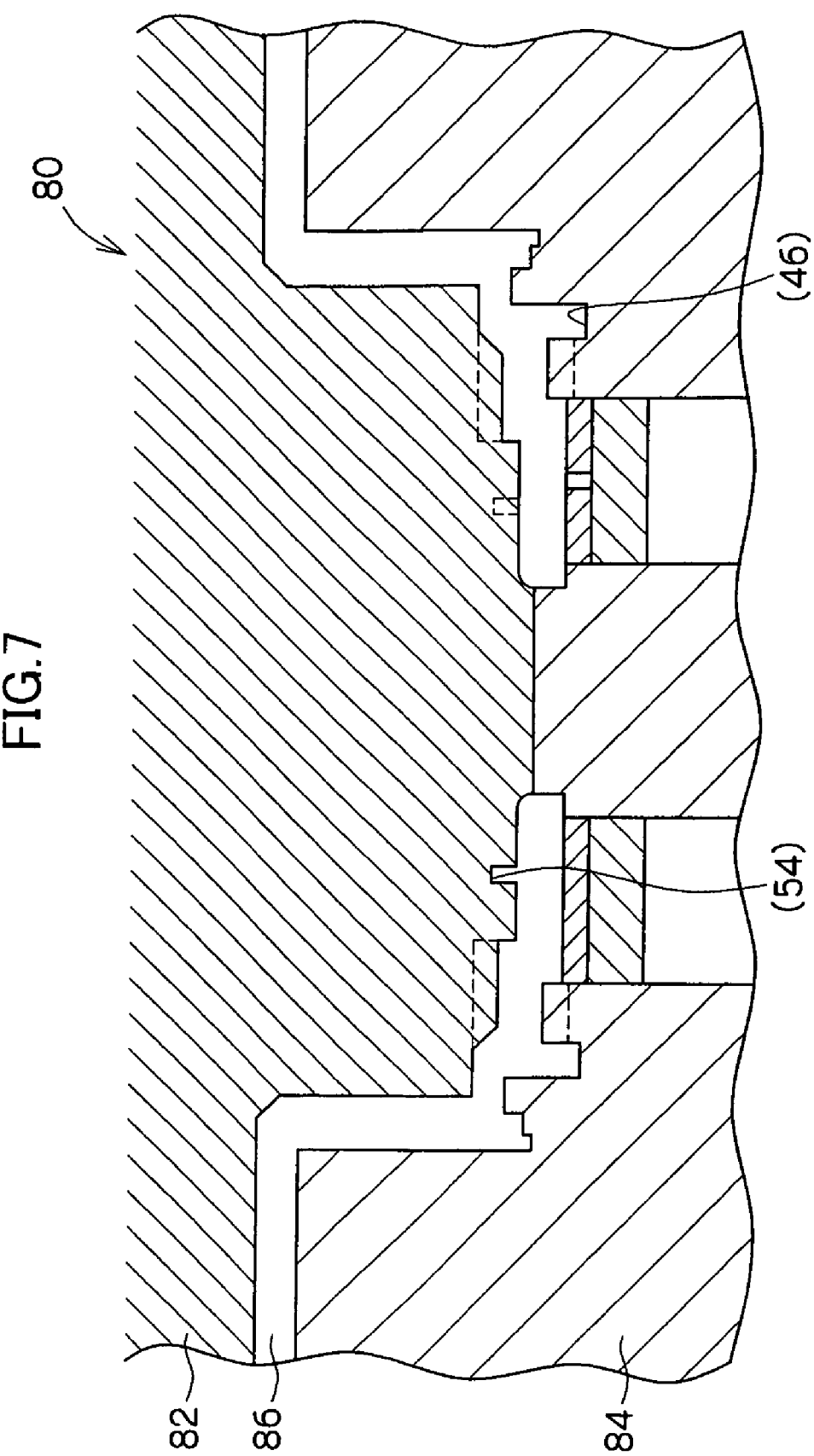
FIG. 7 is a side sectional view showing, in an enlarged manner, a portion of a mold for molding a hub and an upper flange of the reel at which the positioning portions (the convex portions) are formed.

Next, the method of assembling the reel 20, which is accommodated in the above-described recording tape cartridge 10, and the reel plate 40 will be described in detail. As shown in FIGS. 5 through 9, the hub 30 and the upper flange 32 which structure the reel 20 are molded integrally of a resin material. FIG. 7 shows a mold 80 for the injection molding thereof. A fixed mold plate 82 and a movable mold plate 84 are provided at the mold 80. The hub 30 and the upper flange 32 are molded integrally by clamping the mold 80 and filling a molding material (a resin material) from a gate (unillustrated) into a cavity 86 which is formed by the fixed mold plate 82 and the movable mold plate 84.

Three convex portions 54, which are solid-cylindrical and which serve as positioning portions, are provided at uniform intervals at the top surface of the floor wall 36 of the hub 30.

Figure 8:
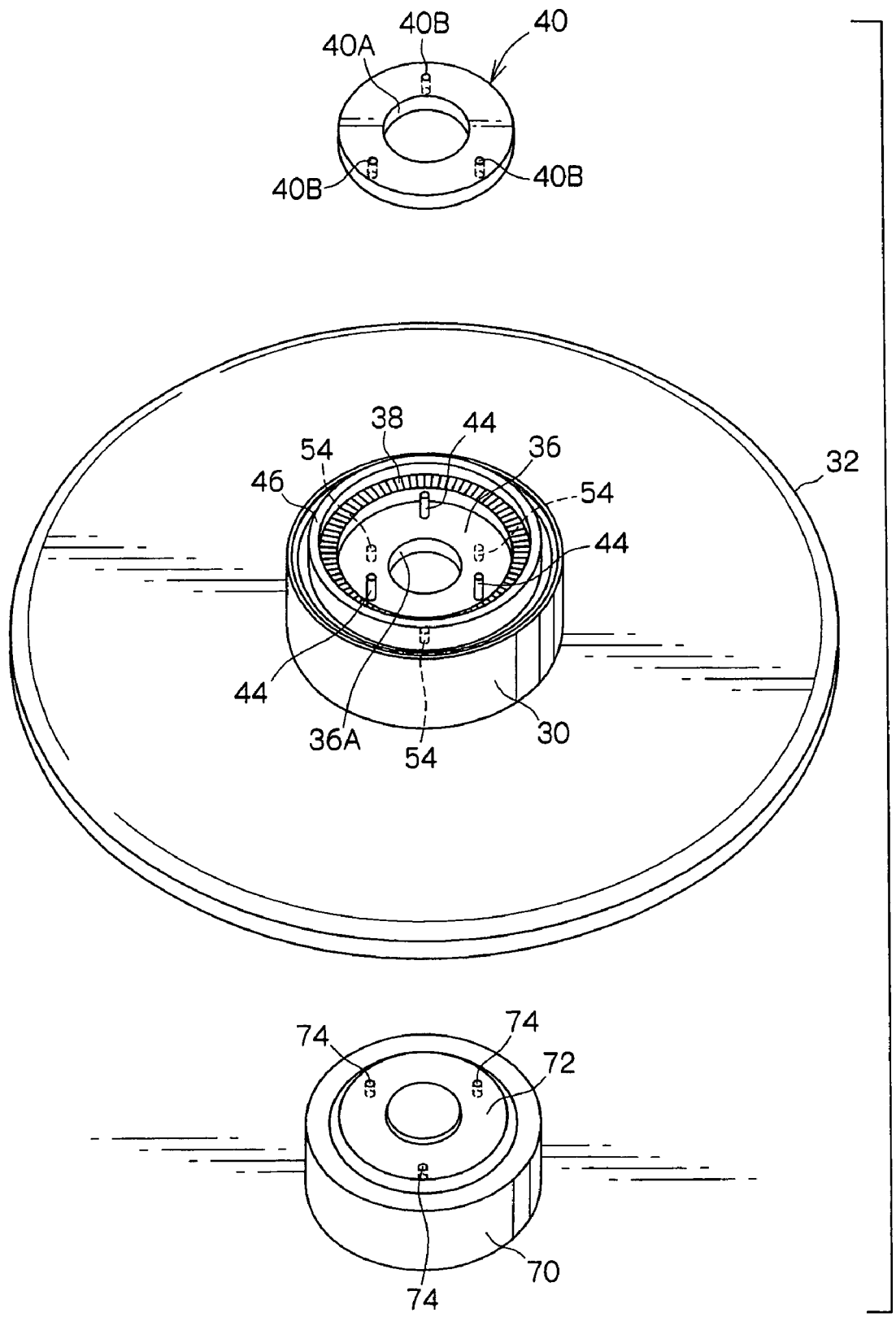
FIG. 8 is an exploded perspective view showing a method of attaching a reel plate by positioning by using the positioning portions (the convex portions).
Figure 9:
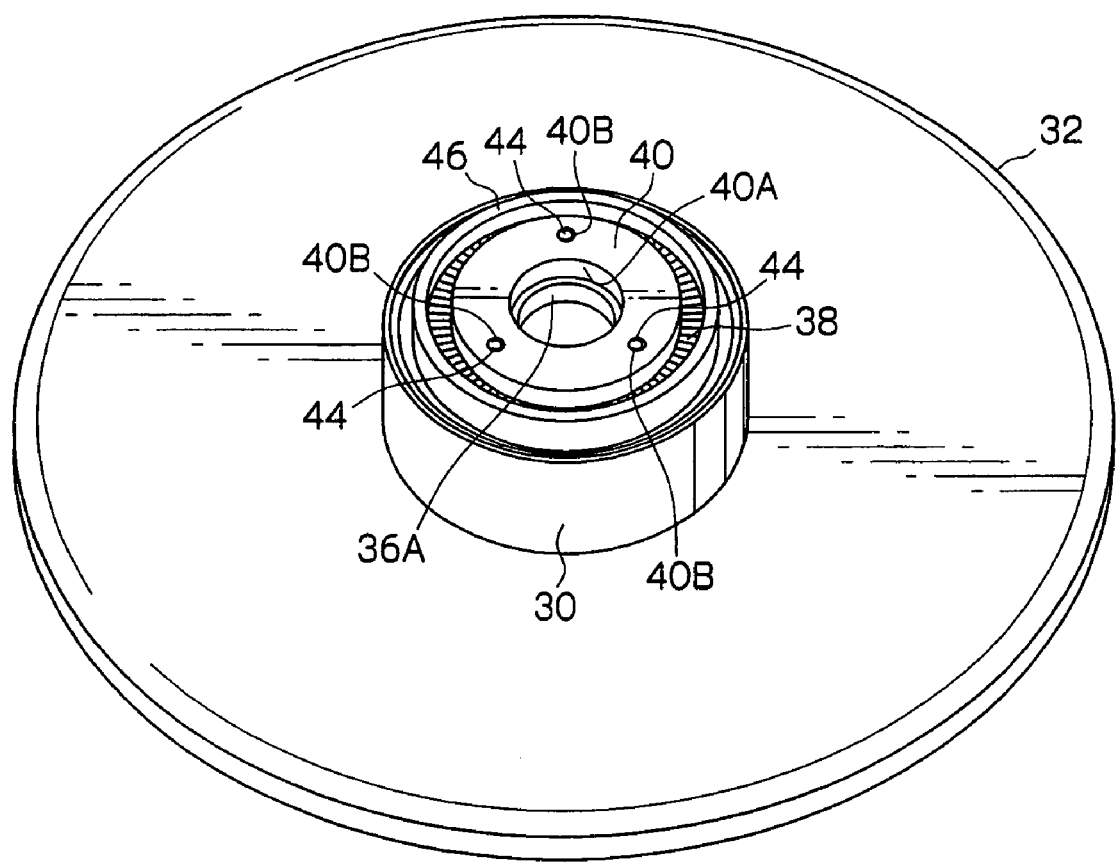
FIG. 9 is a schematic perspective view showing a state in which the reel plate is attached to the hub.
Figure 10:
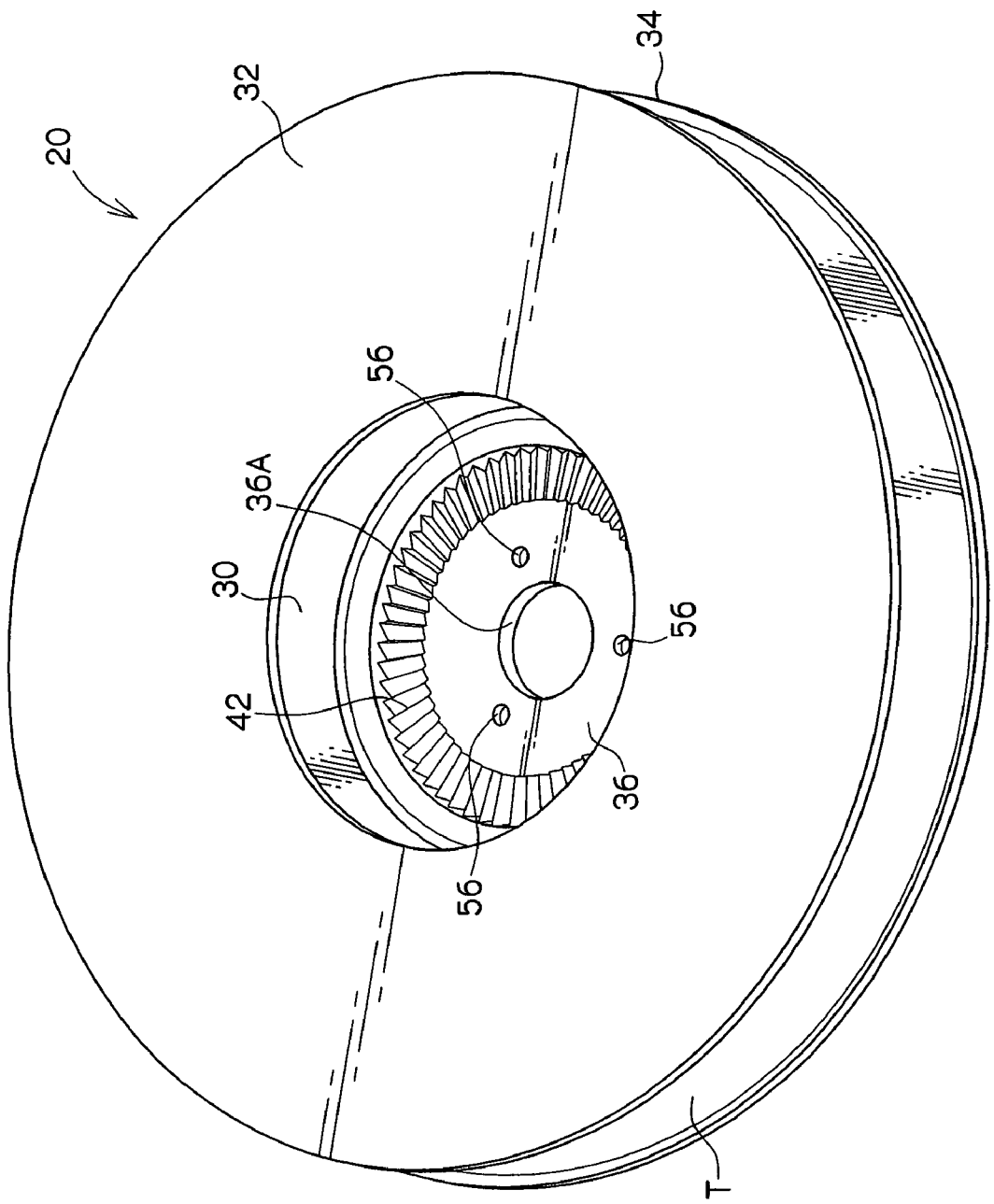
FIG. 10 is a schematic perspective view of a reel at which positioning portions (concave portions) are formed.
Figure 11:
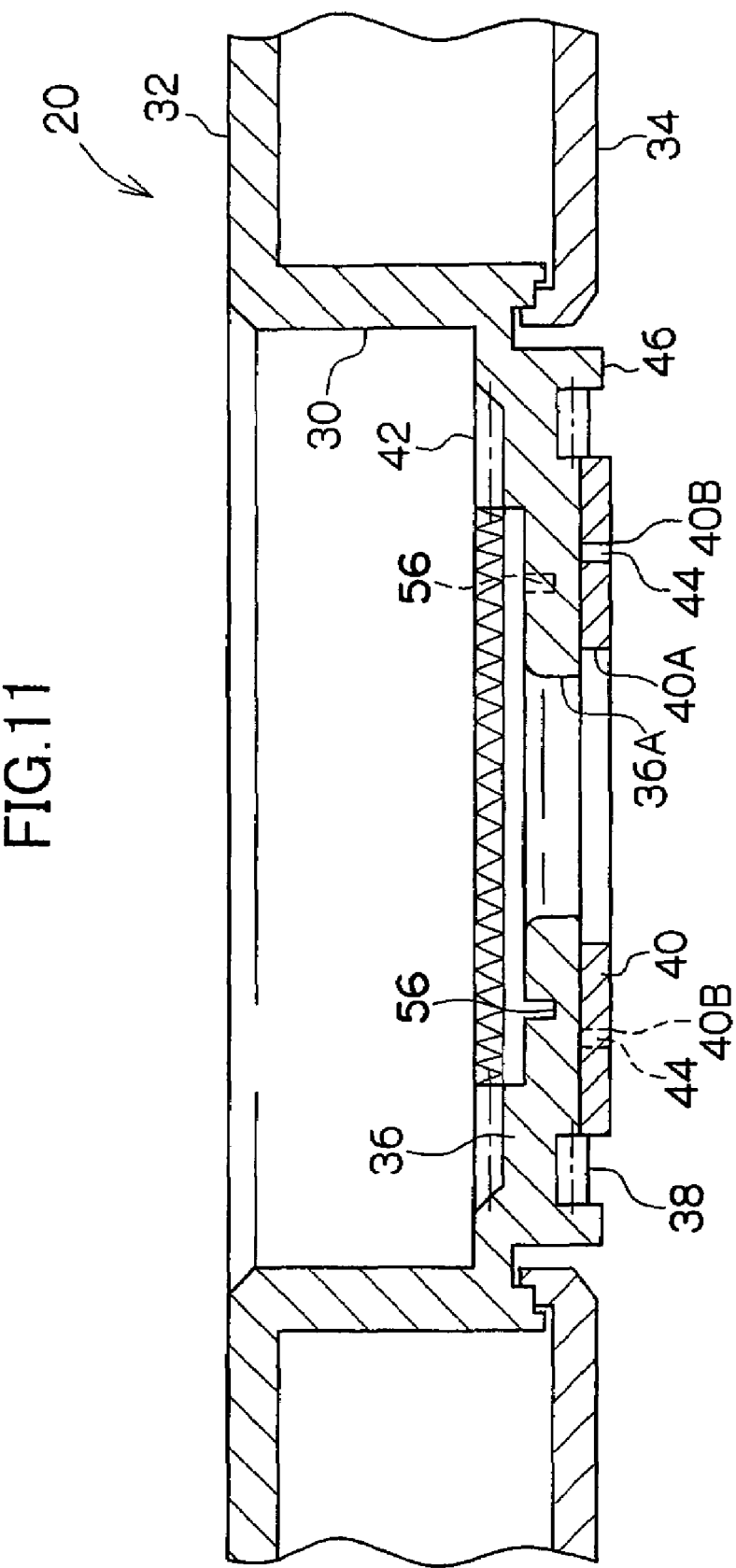
FIG. 11 is a schematic side sectional view showing, in an enlarged manner, a portion of the reel at which the positioning portions (the concave portions) are formed.
Figure 12:
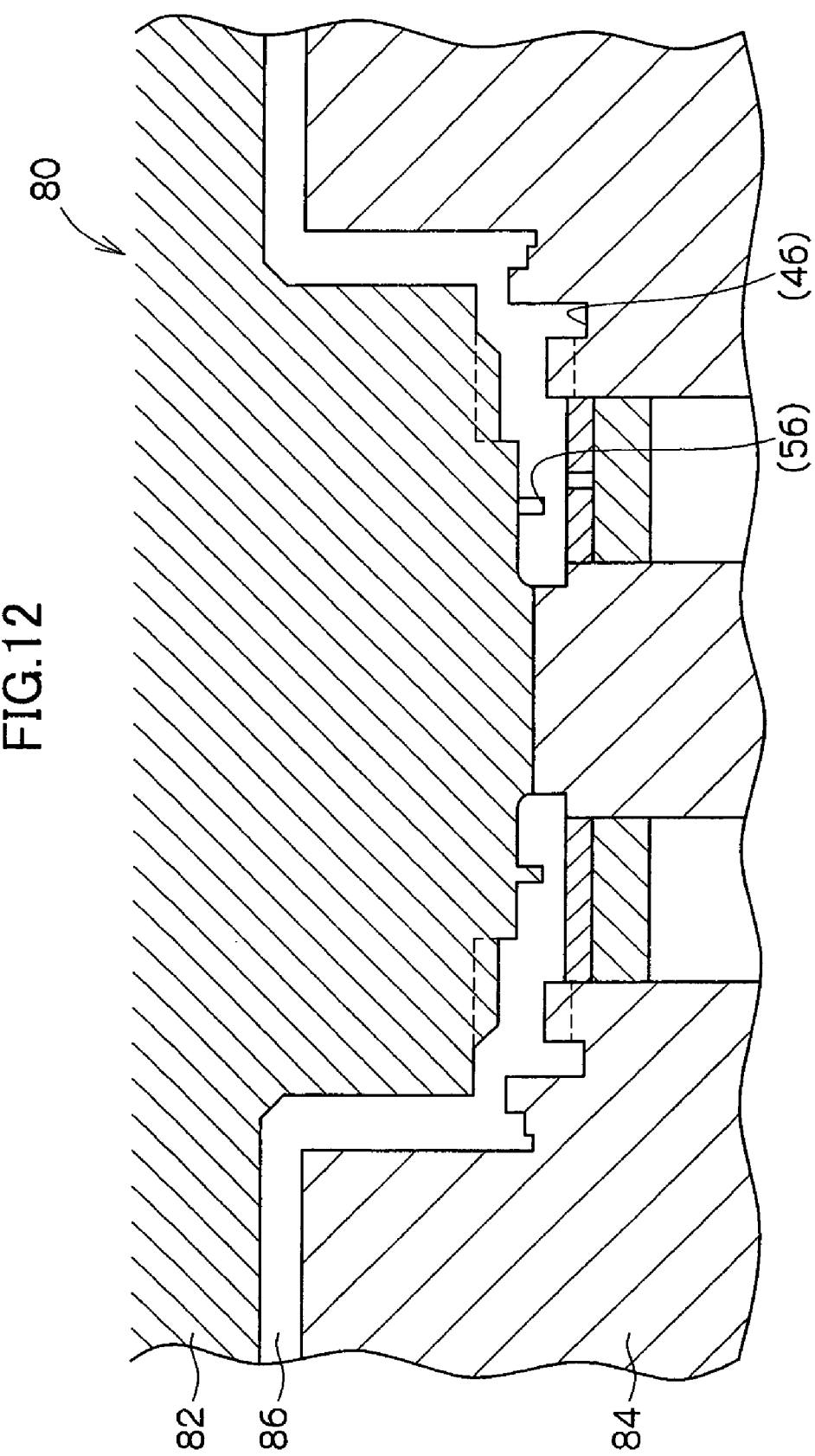
FIG. 12 is a side sectional view showing, in an enlarged manner, a portion of a mold for molding a hub and an upper flange of the reel at which the positioning portions (the concave portions) are formed.
Figure 13:
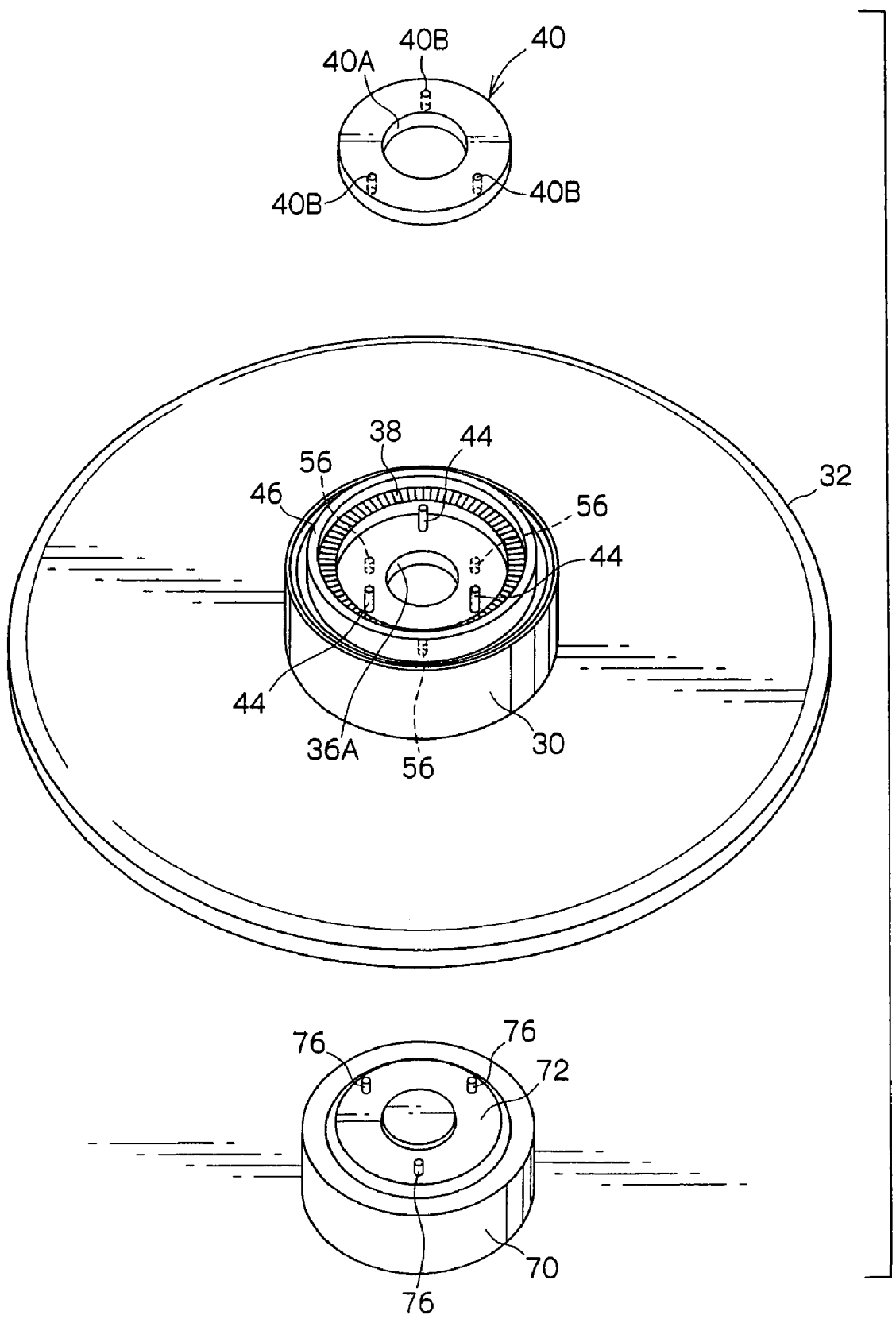
FIG. 13 is an exploded perspective view showing a method of attaching a reel plate by positioning by using the positioning portions (the concave portions).

These convex portions 54 are used for the positioning of pins 44 for caulking at the time of attaching the reel plate 40. Namely, as shown in FIG. 8, when the reel plate 40 is to be attached by caulking, the hub 30, with which the upper flange 32 is integrally molded, is set upside-down at a receiving stand 70. The receiving stand 70 is formed in the shape of a solid cylinder having an outer diameter which is substantially equal to the inner diameter of the hub 30. Three concave portions 74, with which the convex portions 54 can fit together, are provided at uniform intervals in a top surface 72 of the receiving stand 70.

Accordingly, at the time when the reel plate 40 is actually to be attached, first, the hub 30, with which the upper flange 32 is integrally molded, is turned upside-down and placed on the receiving stand 70. At this time, the hub 30 is appropriately rotated either clockwise or counterclockwise manually or by a robot hand or the like, such that the convex portions 54 of the hub 30 fit together with the concave portions 74 of the receiving stand 70.

Here, when three of the convex portions 54 are provided at uniform intervals, the maximum angle by which the hub 30 is rotated is 60°, because the direction of rotation may be either of clockwise or counterclockwise. Namely, if one of each of the convex portion 54 and the concave portion 74 were provided, the maximum angle of rotation would be 180°, and the efficiency at the time of fitting together would not be that good. If two of each of the convex portions 54 and the concave portions 74 were provided, because there are three pins for caulking, there would be cases in which the convex portions 54 and the concave portions 74 would be fit together in opposite directions (i.e., rotated by 180°) if some type of measure were not taken with respect to the positions thereof.

In addition, four of each of the convex portions 54 and the concave portions 74 may be provided. However, in this case as well, there is the need to take some type of measure with respect to the positions thereof, in the same way as in the case in which two of each are provided. However, when four of each of the convex portions 54 and the concave portions 74 are provided at uniform intervals, the angle over which the hub 30 is rotated is 45° at maximum. Namely, the greater the number of the convex portions 54 and the concave portions 74 which are provided at uniform intervals, the smaller the angle of rotation can be made.

In any case, the number of the convex portions 54 and the concave portions 74 and the positions at which the convex portions 54 and the concave portions 74 are disposed are not particularly limited, but the positions at which the convex portions 54 are disposed and the positions at which the pins 44 for caulking are disposed are made to correspond to one another. In this way, the positions (directions) of the pins 44 for caulking of the hub 30 which is set at the receiving stand 70 can be made to be always constant. Further, if the positions at which the convex portions 54 are disposed and the positions at which the pins 44 for caulking are disposed are made to correspond to one another, they may coincide with one another in plan view, or may be offset by an appropriate angle, without causing any problem. However, because three of the pins 44 for caulking are provided to project at uniform intervals, providing the convex portions 54 as well at uniform intervals is preferable because the angle of rotation at the time of rotating the hub 30 can be made to be small, and because it is easy to achieve correspondence between the convex portions 54 and the pins 44 for caulking.

The positions (directions) of the pins 44 for caulking, which project from the hub 30, with respect to the receiving stand 70 are set (fixed) due to the convex portions 54 of the hub 30 fitting together with the concave portions 74 of the receiving stand 70. Therefore, the reel plate 40 can be supplied mechanically. Namely, by supplying the reel plate 40 in a state in which the positions of the small holes 40B are regularized, the small holes 40B can be placed efficiently such that the pins 44 for caulking are inserted therethrough. Accordingly, the work for caulking the pins 44 for caulking by using a horn (ultrasonic waves) can be carried out efficiently, and the efficiency of manufacturing the reel 20 also can be improved.

Further, the three convex portions 54 which are provided at uniform intervals can be used as a second reference surface for evaluating the heightwise direction precision of the annular projection 46 which is used as the reference surface. Namely, as shown in FIG. 7, the annular projection 46 is molded at the movable mold plate 84, and a reference surface is formed only by the precision of the movable mold plate 84. This reference surface is the surface which is used as the reference for all of the determinations (measurements) of heightwise direction precision. Therefore, it is preferable to achieve even higher accuracy. Accordingly, due to the convex portions 54 which are formed at the fixed mold plate 82 being second reference surfaces for confirming the precision of the annular projection 46 (the reference surface), higher precision can be realized.

Namely, the three convex portions 54 which are provided at uniform intervals have a small volume, a small surface area, and are provided at uniform intervals. Therefore, the distribution of stress of the resin flowing in at the time of molding can be made to be uniform (the dispersion can be made to be extremely small). Moreover, because the hub 30 and the upper flange 32 are molded integrally, there are no effects such as a deterioration of strength or the like. Accordingly, the heights of the convex portions 54 and the flatnesses of the top surfaces thereof can be molded with higher accuracy than the annular projection 46.

Accordingly, for example, by setting (placing) the hub 30 with the convex portions 54 thereof facing downward on the receiving stand 70 which has the flat top surface 72 at which no concave portions 74 are formed, the height of the annular projection 46 and the flatness of the top surface thereof can be evaluated. In this way, a more highly accurate reel 20 can be obtained, and it is possible to even more not adversely affect the recording tape T wound on the hub 30.

Further, the positioning portions are not limited to the above-described convex portions 54. As shown in FIGS. 10 through 13, three concave portions 56, which are cylindrical and serve as positioning portions, may be provided at uniform intervals in the top surface of the floor wall 36 of the hub 30. In this case, it goes without saying that three convex portions 76, which can fit together with the concave portions 56, are provided at uniform intervals at the top surface 72 of the receiving stand 70. Because the operation and effects in this case are the same as those in the above-described case of the convex portions 54, description thereof will be omitted. However, because the concave portions 56 are what is formed in the top surface of the floor wall 36 of the hub 30, it is difficult for the concave portions 56 to be a second reference surface for evaluating the annular projection 46 (the reference surface) as described above.

Figure 14:
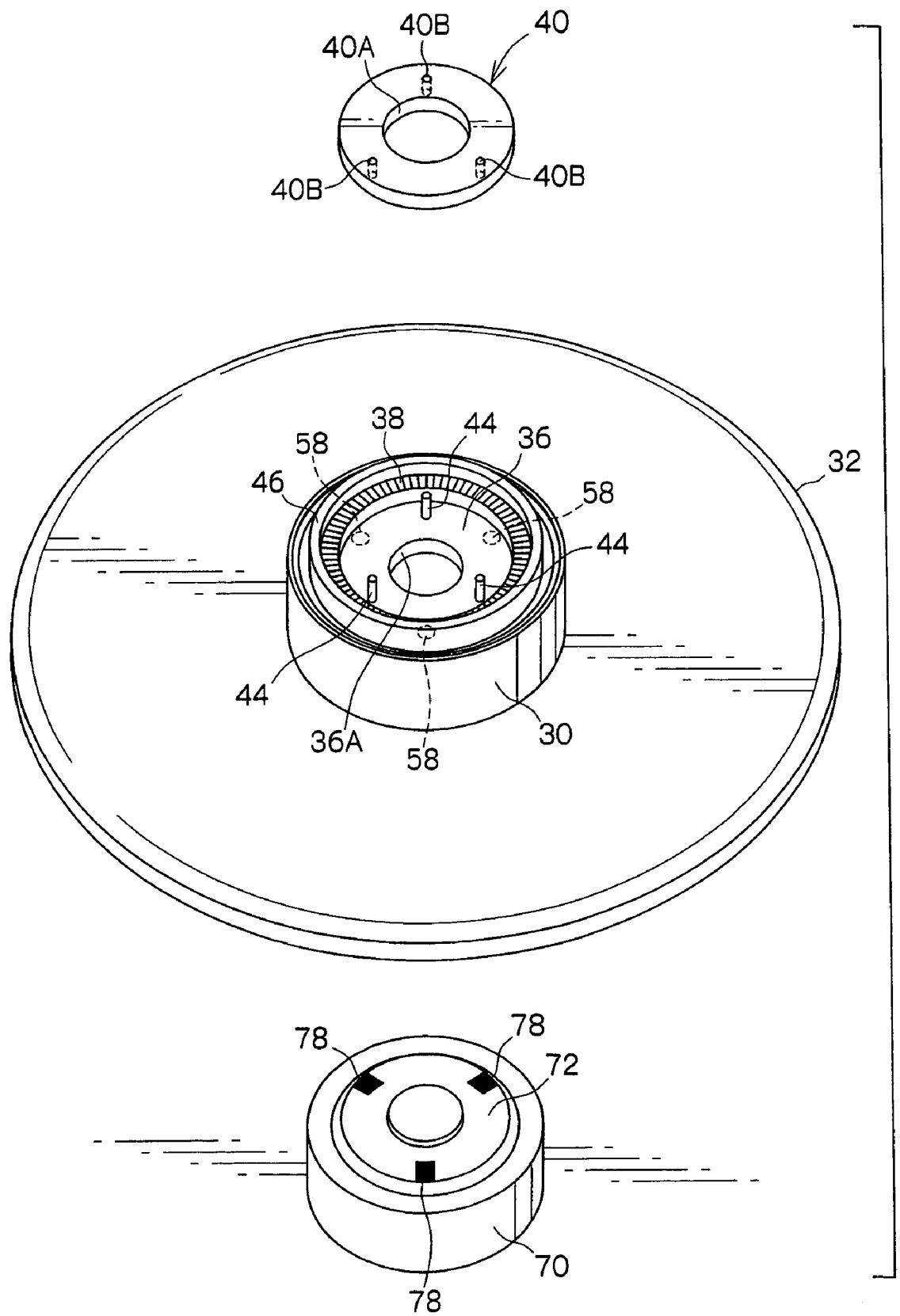
FIG. 14 is an exploded perspective view showing a method of attaching a reel plate by positioning by using positioning portions (marks).

Moreover, as shown in FIG. 14, marks 58 may be provided on the top surface of the floor wall 36 of the hub 30, and sensors 78, which are able to detect the marks 58, may be provided on the top surface 72 of the receiving stand 70. In the same way as described above, the numbers of the marks 58 and the sensors 78 and the positions at which they are disposed are not particularly limited provided that the positions (directions) of the pins 44 for caulking with respect to the receiving stand 70 can be arranged constantly. For example, three of each of the marks 58 and the sensors 78 may be provided at uniform intervals. In this case, the maximum angle of rotation of the hub 30 is 60°. Further, because the operation and effects in this case are similar to those in the above-described case of the convex portions 54 and the concave portions 56, description thereof is omitted.

In any case, as described above, it suffices for the positions of the convex portions 54 and the concave portions 74, and the concave portions 56 and the convex portions 76, and the marks 58 and the sensors 78 to be set such that the pins 44 for caulking are always disposed in regular directions with respect to the receiving stand 70. In accordance with such a structure, when the reel plate 40 is attached to the bottom surface of the floor wall 36 of the hub 30 by caulking, it suffices for the positions of the small holes 40B to always be constant with respect to the pins 44 for caulking. Therefore, the reel plate 40 can be supplied efficiently. Accordingly, the efficiency of manufacturing the reel 20 can be improved.

What is claimed is:

1. A reel comprising:
   a hub which is shaped as a cylindrical tube having a bottom, and around which a recording tape is wound;
   a flange provided at an end portion of the hub, and holding a widthwise direction end portion of the recording tape;
   a reel plate attracted by magnetic force to a rotating shaft of a drive device;
   a pin for caulking which projects from a bottom surface of a floor wall of the hub; and
   a positioning portion provided at a top surface of the floor wall of the hub,
   wherein the positioning portion is located relative to the pin for caulking so as to orient the hub, positioning the pin for attachment of the reel plate and caulking.

2. The reel of claim 1, wherein the positioning portion is a convex portion.

3. The reel of claim 1, wherein the positioning portion is a concave portion.

4. The reel of claim 1, wherein the positioning portion is a mark.

5. The reel of claim 1, wherein a plurality of the positioning portions are provided.

6. The reel of claim 1, wherein three of the positioning portions are provided at uniform intervals.

7. A reel comprising:
   a hub which is shaped as a cylindrical tube having a bottom, and around which a recording tape is wound;
   an upper flange provided integrally at an upper end portion of the hub, and holding a widthwise direction upper end portion of the recording tape;
   a lower flange fused to a lower end portion of the hub, and holding a widthwise direction lower end portion of the recording tape;
   a reel plate attracted by magnetic force to a rotating shaft of a drive device;
   a pin for caulking which projects from a bottom surface of a floor wall of the hub; and
   a positioning portion provided at a top surface of the floor wall of the hub,
   wherein the positioning portion is located relative to the pin for caulking so as to orient the hub, positioning the pin for attachment of the reel plate and caulking.

8. The reel of claim 7, wherein the positioning portion is a convex portion.

9. The reel of claim 7, wherein the positioning portion is a concave portion.

10. The reel of claim 7, wherein the positioning portion is a mark.

11. The reel of claim 7, wherein a plurality of the positioning portions are provided.

12. The reel of claim 7, wherein three of the positioning portions are provided at uniform intervals.

13. The reel of claim 7, wherein a reference surface for measuring precision in a heightwise direction is provided at the hub.

14. The reel of claim 7, wherein a reference surface for measuring precision in a heightwise direction is provided at the hub, and the positioning portion is three convex portions which are provided at uniform intervals, and a flatness of the reference surface is evaluated by using the convex portions.

15. A method of attaching a reel plate comprising the steps of:
   setting a hub, which is shaped as a cylindrical tube having a bottom and around which a recording tape is wound, at a receiving stand;
   causing a positioning portion provided at a top surface of a floor wall of the hub to engage with a portion-to-be-positioned formed at the receiving stand;
   fitting a hole of a reel plate onto a pin for caulking which projects from a bottom surface of the floor wall of the hub set at the receiving stand; and
   caulking the pin for caulking.

16. The method of attaching a reel plate of claim 15, wherein the positioning portion is a convex portion, and the portion-to-be-positioned is a concave portion.

17. The method of attaching a reel plate of claim 15, wherein the positioning portion is a concave portion, and the portion-to-be-positioned is a convex portion.

18. The method of attaching a reel plate of claim 15, wherein the positioning portion is three convex portions provided at uniform intervals, and the portion-to-be-positioned is three concave portions provided at uniform intervals.

19. The method of attaching a reel plate of claim 15, wherein the positioning portion is three concave portions provided at uniform intervals, and the portion-to-be-positioned is three convex portions provided at uniform intervals.

20. The method of attaching a reel plate of claim 15, wherein the positioning portion is a mark, and the portion-to-be-positioned is a sensor which reads the mark.

21. A reel comprising:
   a hub which is shaped as a cylindrical tube having a bottom, and around which a recording tape is wound;
   a flange provided at an end portion of the hub, and holding a widthwise direction end portion of the recording tape;
   a reel plate attracted by magnetic force to a rotating shaft of a drive device;
   a pin for caulking which projects from a bottom surface of a floor wall of the hub; and
   three positioning portions provided at a top surface of the floor wall of the hub,
   wherein the positioning portions are located relative to the pin for caulking so as to orient the hub, positioning the pin for attachment of the reel plate and caulking.

22. The reel of claim 21, wherein the positioning portions are convex portions.

23. The reel of claim 21, wherein the positioning portions are concave portions.

24. The reel of claim 21 further comprising an engaging gear wherein, the engaging gear can engage a braking gear, locking the reel and preventing rotation.

25. A reel comprising:
- a hub which is shaped as a cylindrical tube having a bottom, and around which a recording tape is wound;
- a flange provided at an end portion of the hub, and holding a widthwise direction end portion of the recording tape;
- a reel plate attracted by magnetic force to a rotating shaft of a drive device;
- a pin for caulking which projects from a bottom surface of a floor wall of the hub; and
- means for positioning the caulking pin for attachment of the reel plate and caulking.

* * * * *